Sept. 26, 1967 SHIGERU TOYOHARA ETAL 3,344,295
ROTORS FOR SYNCHRONOUS MOTORS
Filed July 16, 1965

INVENTOR
SHIGERU TOYOHARA
BY Hiroshi Yamada

H. Edward Mestern 3,344,295
ROTORS FOR SYNCHRONOUS MOTORS
Shigeru Toyohara, Omiya-shi, and Hiroshi Yamada, Koga-shi, Japan, assignors to San-Oh Kogyo Kabushiki Kaisha, Tokyo-to, Japan, a joint-stock company of Japan
Filed July 16, 1965, Ser. No. 472,489
Claims priority, application Japan, Aug. 22, 1964, 39/66,163, 39/66,164
2 Claims. (Cl. 310—211)

This invention relates to rotors for synchronous motors and more particularly to a new squirrel-cage rotor for self-starting, reaction synchronous motors or reluctance motors.

A conventional squirrel-cage rotor for self-starting, reaction synchronous motors comprises a laminated core clamped between a pair of short circuiting end rings which are interconnected by a number of conductor bars axially extending through the core. The laminated core is provided with salient poles around its periphery which are generally parallel with the axis of the rotor. With this construction, however, due to the presence of the salient poles, the air gap between the rotor and the stator is not uniform around the periphery of the rotor, thus causing magnetic noise, large windage loss and difficulty in mechanically balancing the rotor. Moreover, as the salient poles are parallel to the axis of the rotor the torque produced by the interaction between the rotor and stator pulsates as the rotor rotates. In other words, the difference between the maximum value and the minimum value of the torque is relatively large, so that it is difficult to smoothly pull in the motor into synchronism.

Accordingly it is an object of this invention to provide an improved rotor for self-starting, reaction synchronous motors having a smooth cylindrical surface whereby windage loss and mechanical vibration can be reduced.

Another object of this invention is to provide an improved rotor for self-starting, reaction synchronous motors wherein pulsation of torque is reduced so that the motors can smoothly accelerate and operate.

Briefly stated, in achieving the objects of the invention in one embodiment thereof, a rotor is provided comprising a plurality of stacked laminations. Each of the laminations is provided with a number of salient portions and depressions there between around its periphery, a plurality of openings and a shaft bore. These laminations are stacked one upon the other with their salient poles skewed at an angle with respect to the axis of the rotor, and a non-magnetic conductor such as aluminum is die-cast to form a structure consisting of conductor bars, a pair of end rings, and fillers in the spaces defined by salient poles and depressions between them. Thus, these conductor bars, end rings, and fillers are formed as an integral body.

Since the rotor of this invention has a smooth cylindrical surface its windage loss and vibration due to mechanical unbalance can be reduced. Moreover, since salient poles are skewed, fluctuation of torque is reduced, thereby affording pulling into synchronism.

The novel features which characterize our invention are set forth with particularity in the appended claims. The invention itself, however, both as to its organization and method of operation together with further objects and advantages thereof may best be understood by reference to the following description with respect to a preferred embodiment thereof taken in connection with the accompanying drawing in which like parts are designated by like reference characters, and in which:

Referring now to the accompanying drawing, each of the core laminations 1 made of a magnetic material, such as silicon steel, is provided with a number of arcuate raised portions $1a$ acting as the salient poles of the motor, flat or depressed portions $1b$ between raised portions, a plurality of opening $1c$ arranged near the circumference of the lamination and adapted to receive conductor bars which are cast in a manner to be described later, and a shaft bore $1d$ at the center of the lamination.

Figure 1:
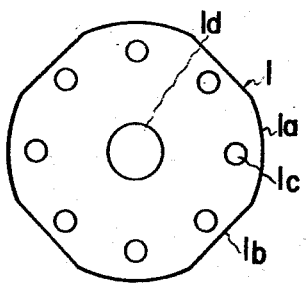
FIG. 1 is a plan view of a lamination utilized to fabricate a rotor embodying this invention.
Figure 2:
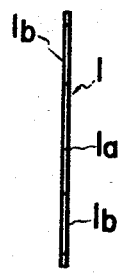
FIG. 2 is a side view of the lamination shown in FIG. 1.
Figure 3:
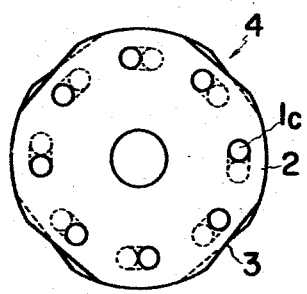
FIG. 3 is an end view of the laminated core.
Figure 4:
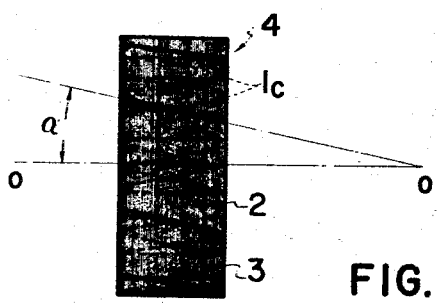
FIG. 4 is a side view of the laminated core shown in FIG. 3.
Figure 5:
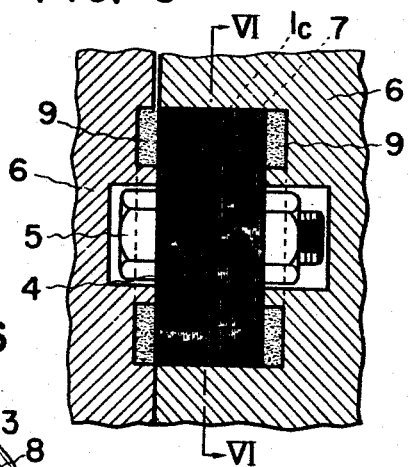
FIG. 5 shows a casting mold, partly in section, utilized to cast conductors, end plates, and fillers.
Figure 6:
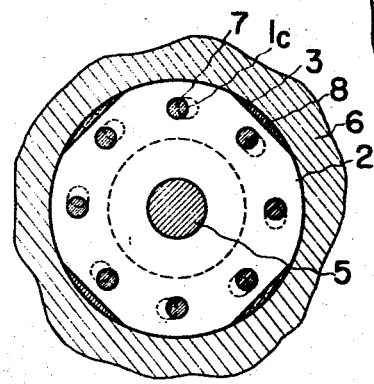
FIG. 6 shows a cross-sectional view taken along a line VI—VI in FIG. 5.
Figure 7:
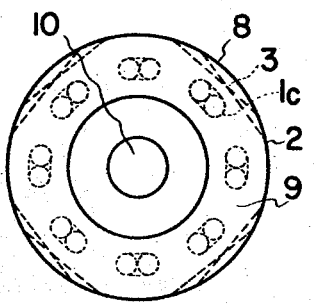
FIG. 7 shows an end view of a finished rotor according to the invention.
Figure 8:
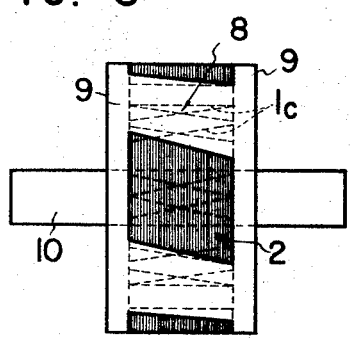
FIG. 8 is a side view thereof.

As shown in FIGS. 3 and 4, a plurality of laminations are laminated to form a core 4 with, their raised portions $1a$ skewed by an angle $\alpha$ with respect to the axis 0—0. Thus, a required number of skewed salient poles and conductor slots are formed. The core assembly is temporarily clamped by means of a clamping device 5, and then placed into a casting mold 6 as a core to be provided with conductor bars 7 extending through openings and a pair of end rings 9 short circuiting the conductor bars by die-casting a suitable non-magnetic material of high conductivity, for example, aluminum. Concurrently with the casting of conductor bars and end rings, molten aluminum also fills the spaces between the flat portions $1b$ and the inner wall of the mold to form fillers 8 thereby to provide a smooth cylindrical surface to the finished rotor. After casting, the clamping device 5 is removed and a shaft 10 is inserted in the shaft bore $1d$ to complete the rotor.

Thus, as the rotor of this invention has a smooth cylindrical surface the air gap between the rotor and stator becomes uniform, thereby decreasing windage loss, which was heretofore unavoidable in salient pole type rotors. Moreover, since it is easy to mechanically balance the rotor, vibrations during the operation of the motor can be reduced. Further, as the salient poles are skewed with respect to the axis of the rotor, pulsation of the torque is reduced, whereby the rotor can be smoothly pulled into synchronism. Also, electromagnetic noise caused by the pulsation of torque can be greatly decreased. In one actual form of the rotor according to the invention, the difference between the maximum value and the minimum value of the torque was reduced to one third of that of the conventional salient pole type rotor. Thus the motor of this invention is particularly suitable for use in acoustic apparatus and the like.

While this invention has been shown and described in connection with a preferred embodiment thereof, this invention is not limited thereto and includes all modifications and alternations as fall within the true spirit and scope of the invention.

What we claim is:
1. A rotor for synchronous motors comprising a core including a plurality of laminations, each of said laminations having a plurality of salient poles and depressed portions between said salient poles on its periphery and a plurality of openings to receive conductor bars; a plurality of conductor bars extending through said openings, a pair of end rings short circuiting said conductor bars, and metal fillers in spaces defined by said salient poles and depressed portions therebetween, said salient poles and fillers cooperating to form a smooth cylindrical sur- face, and said conductor bars, fillers, and end rings being formed as a unitary body by die-casting.

2. The rotor according to claim 1 wherein said salient poles of the laminated core are skewed with respect to the axis of said rotor.

No references cited.

MILTON O. HIRSHFIELD, *Primary Examiner.*

L. L. SMITH, *Assistant Examiner.*